A. E. WOLTER.
DIRECTION SIGNAL FOR MOTOR VEHICLES.
APPLICATION FILED JAN. 5, 1920.
1,369,998.
Patented Mar. 1, 1921.
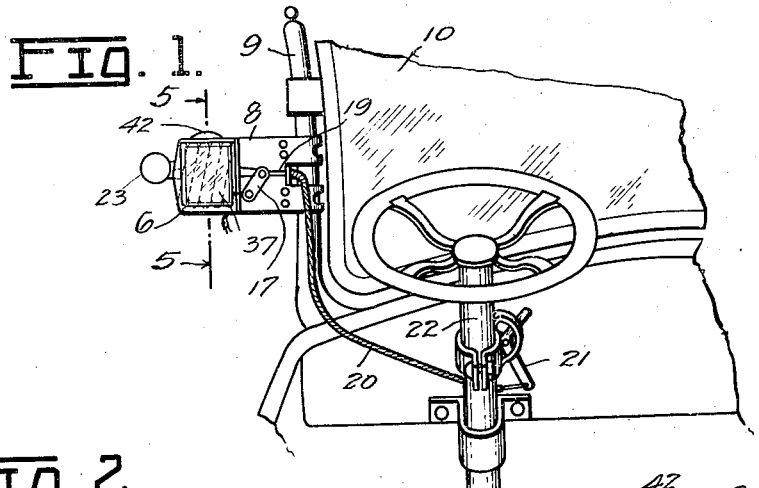
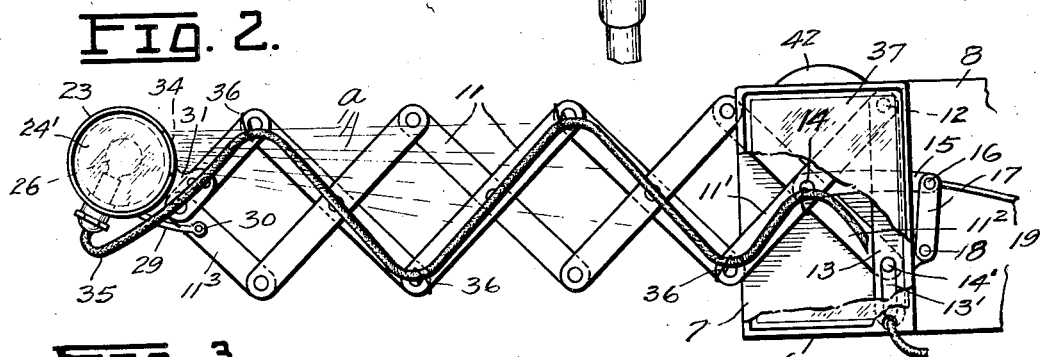
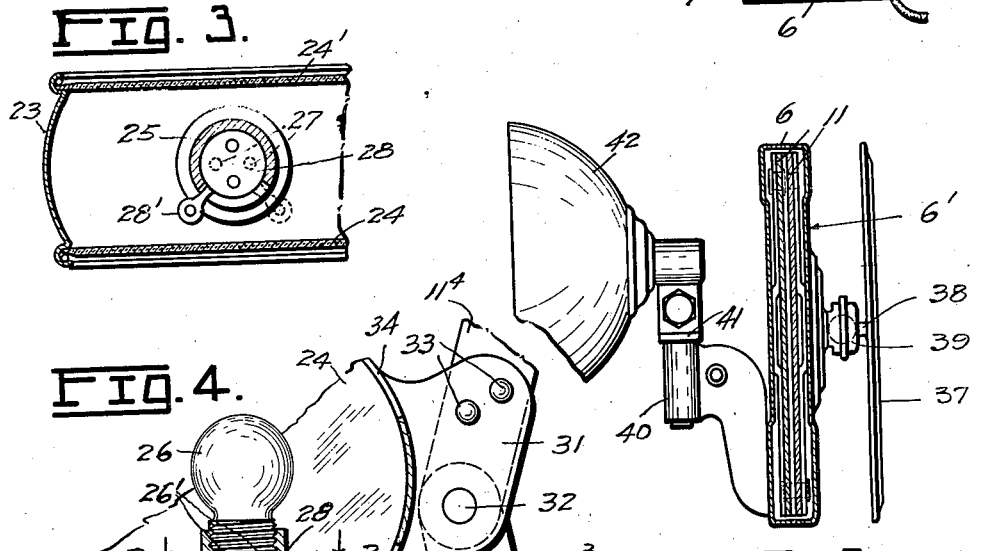
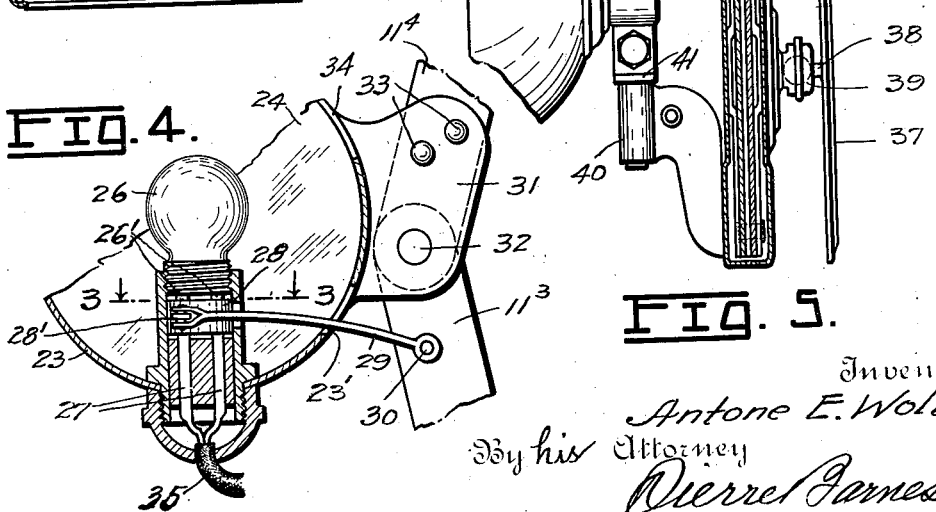
Inventor:
Antone E. Wolter
By his Attorney
Pierre Barnes

UNITED STATES PATENT OFFICE.

ANTONE E. WOLTER, OF SEATTLE, WASHINGTON.

DIRECTION-SIGNAL FOR MOTOR-VEHICLES.

1,369,998.  Specification of Letters Patent.  Patented Mar. 1, 1921.

Application filed January 5, 1920. Serial No. 349,356.

*To all whom it may concern:*

Be it known that I, ANTONE E. WOLTER, a citizen of the United States, residing at Seattle, in the county of King and State of Washington, have invented certain new and useful Improvements in Direction-Signals for Motor-Vehicles, of which the following is a specification.

This invention relates to direction signals for motor vehicles; and its object is the provision of neat appearing and efficient devices of this character which may be conveniently employed by the driver to indicate to pedestrians or other cars an intention to turn at right angles from the direction in which the vehicle is traveling.

A further object of the invention is to provide in association with the direction signal device of mirror and spot light features for the use of the driver.

With these ends in view, the invention consists in the novel construction, arrangement and combination of parts as will be hereinafter described and claimed.

In the accompanying drawings, Figure 1 is an elevational view looking forward from the driver's seat of an automobile, showing a portion of the latter and with the signal arm in its retracted or concealed position. Fig. 2 is a view of the signal devices with the arm thereof extended.

Fig. 3 is a sectional view through the lamp casing, said section being taken through 3—3 of Fig. 4. Fig. 4 is a fragmentary view of the lamp and the outer end of the signal arm to illustrate the controllers for the light circuit. Fig. 5 is a view in side elevation of the spot light and mirror members to illustrate the manner of attaching the same to the signal-arm housing which is shown in section through 5—5 of Fig. 1.

In carrying out the invention, I provide a case 6 of a rectangular shape which is open as at 7 at its outer side and is rigidly connected from its inner side to a bracket 8 which is secured to the frame member 9 at the left hand side of the windshield 10.

The case 6 serves as a housing for a signal arm of the lazy tong type comprising links 11 pivotally connected together. One of the links, as $11^1$ at the inner end of the arm is pivotally connected at 12 to an upright bar 13 provided within said housing. The other of the two inner links, as $11^2$, is provided with a stud $14^1$ slidable in a vertical slot $13^1$ provided in said bar. One of the pivotal pins, as 14, in the axis of the arm is connected through a hole in the casing by a link 15 with a pin 16 in the upper end of an arm 17 which is fulcrumed at 18 to a lug provided at the inner side of the housing 6.

The pin 16 is also connected to an end of a controlling wire 19 which extends through a flexible tubular guard 20 to an actuating lever 21 provided within convenient reach of the driver as, for example, on the steering post 22. 23 represents a lamp casing of a cylindrical form having its axis arranged longitudinally of the vehicle and provided in its front and rear with lenses 24 and $24^1$ of red glass, desirably.

Provided in the casing 23 is a lamp socket 25 for an electric light bulb 26. Within said socket and between the bulb terminals $26^1$ and the terminals of circuit wires 27 is positioned a cylindrical switch member 28 having an arm $28^1$ which is connected by a rod 29 extending through a slot $23^1$ in the casing, with a pin 30 extending from the arm link $11^3$. The casing 23 is itself connected to the signal arm by means of a bracket 31 pivotally to the arm-pin 32 and to the link $11^4$ in a rigid manner by rivets 33 whereby the casing 23 is rotatably moved about the axis of the pin 32 in accordance with the inclination of the link $11^4$.

An aperture 34 is provided in the peripheral wall of casing 23 so that light rays, as denoted by $a$ in Fig. 2, from the lamp will illuminate the signal arm when the casing is tilted in projecting the latter outwardly. The connections between the switch member 28 and the link $11^3$ is such that the member will be rotated to respectively close and open the light circuit when the signal arm is extended from and retracted into the housing therefor. The electric wires for the lamp are desirably protected by an insulating wrapping denoted by 35 which is connected at intervals to the signal arm by wires as represented by 36 in Fig. 2.

A mirror 37 is connected by a bracket-arm 38 to the rear wall $6^1$ of the case 6, said bracket arm including a ball-and-socket joint indicated by 39.

To the front of the case 6 is secured a socket attachment 40 for the stem 41 of a spot light 42.

By suitably swinging the lever 21 (Fig. 1) the signal arm may be extended into its signaling position as shown in Fig. 2 or retracted therefrom into its housed Fig. 1 position. When the arm is thrust out the movements of the two links 11³ and 11⁴ afford relative motion between the casing 23 and the pin 30 on link 11³ to effect the turning of the switch member 28 into circuit completing position.

The manner of regulating the spot light and mirror is obvious.

What I claim, is—

A vehicle signal comprising in combination, a casing adapted to be secured to a vehicle, said casing being open at one side, a bar rigidly secured within the casing at the other side, a lazy tongs arm operatively connected to said bar, means to effect the extension and contracting of said arm from and into said casing, a light bulb, circuit connections therefor, a lamp casing for said light bulb, an electric switch located within the lamp casing for said circuit connections, and operative connection between the movable switch element and one of the outer links of said arm, the other outer link of the arm being rigidly connected to said lamp casing whereby the extending and contracting of the arm respectively serves to close and open said circuit connections.

Signed at Seattle Washington, this 23rd day of December, 1919.

ANTONE E. WOLTER.

Witnesses:
 PIERRE BARNES,
 A. L. BOWEN.